Sept. 9, 1958 S. A. JONES ET AL 2,850,808
GRID STRUCTURE FOR FLUIDIZED SOLIDS CONTACTING APPARATUS
Filed July 2, 1956 2 Sheets-Sheet 1

INVENTORS
SAM A. JONES
S. T. B. KEATING
BY
Harry B. Keck
ATTORNEY

United States Patent Office 2,850,808
Patented Sept. 9, 1958

2,850,808

GRID STRUCTURE FOR FLUIDIZED SOLIDS CONTACTING APPARATUS

Sam A. Jones and Schuyler T. B. Keating, Pittsburgh, Pa., assignors to Consolidated Coal Company, a corporation of Pennsylvania Application July 2, 1956, Serial No. 595,426

5 Claims. (Cl. 34—57)

The present invention relates to an improved grid structure useful in fluidized solids contacting systems in which finely divided solids are contacted with gases under fluidized conditions sequentially in two treatment zones.

The fluidized solids contacting technique is widely employed for treating finely divided solids with gases. According to this technique, an inventory of finely divided solids is confined in a vessel and maintained in random motion by means of gases passing upwardly therethrough. Intimate gas-to-solids contacting between the finely divided solids and the fluidizing gases can be realized according to this technique.

In some installations, it is desired to provide an intimate fluidized contacting between finely divided solids and fluidizing gases under specified conditions for a predetermined residence time and thereafter to subject the same solids to further intimate fluidized contacting with the same gases under different conditions for a predetermined residence time. Sequential contacting processes having two treatment zones can be conducted in a single vessel by providing a grid structure between the ends of the vessel to separate the first treatment zone from the second treatment zone. A simple grid structure might constitute a horizontal plate having a pluraliy of apertures distributed through its surface. Finely divided solids and treating gases are introduced into the lower portion of the vessel which constitutes the first treatment zone. The treating gases, in passing through the first treatment zone, entrain quantities of the solids confined therein and pass upwardly through the grid structure into the second treatment zone for further processing under fluidized solids contacting conditions.

The function of the grid structure is: (1) to support the fluidized bed in the second treatment zone; (2) to regulate the rate at which solids are removed from the first treatment zone, thereby permitting regulation of the residence time of the solids in the first treatment zone; (3) to restrict the cross-sectional area for gases flowing from the first treatment zone into the second treatment zone whereby the superficial linear velocity of the treating gases may be increased sufficiently to assure the transfer of entrained finely divided solids from the first treatment zone into the second treatment zone.

The superficial linear velocity of gases passing from the first treatment zone into the second treatment zone is determined by the ratio of cumulative cross-sectional area of the apertures in the grid structure to the cross-sectional area of the treatment zone. The number of apertures in the grid structure determines the quality of gas distribution at the inlet of the second treatment zone. Customarily a plurality of apertures are provided in a geometrical pattern over the surface of the horizontal grid. The cross-sectional area of each aperture should be many fold larger than the cross-sectional area of the finely divided solids undergoing treatment.

Difficulties with the described system arise from plugging of the apertures with the finely divided solids. Finely divided solids passing upwardly from the first treatment zone will tend sporadically to compact into mounds of material which plug apertures from the bottom surface of the horizontal grid. Loosely compacted mounds of the finely divided solids prevent gases from passing through the plugged aperture, but fortuitously disintegrate rapidly when the upward velocity component of the fluidizing gases is removed from the area of the plugged aperture where the plug creates a "dead" zone. This rapid disintegration eliminates the plug and permits processing to continue. However, during the brief period when one or more apertures are plugged, the gas velocity through the remaining unplugged apertures must increase at the same time that gases are prevented from passing through the plugged apertures. The resulting interruption of the desired uniform distribution of gases entering the second treatment zone introduces adverse fluctuations in the fluidizing properties within the second treatment zone. The tendency for the second treatment zone to exhibit deleterious "slugging" or "channeling" is greatly increased.

Frequently, the compacted mounds of finely divided solids do not disintegrate, but remain compacted causing permanent plugs. When a substantial portion of the apertures become permanently plugged, further processing must be discontinued until the permanent plugs can be mechanically eliminated.

The plugging problem associated with horizontal grids is particularly acute where the finely divided solids undergoing treatment have agglomerative properties. An example of such a system is a two stage fluidized process for thermal treatment of agglomerative coals. Agglomerative coals, on exposure to elevated temperatures, exhibit plastic properties and tend to adhere and cohere. Even loosely compacted mounds of agglomerative materials have increased tendencies to form permanent plugs which do not disintegrate.

According to the present invention, plugging the undersurfaces of grid structures may be avoided and consequently the resulting slugging and channeling of fluidized beds of finely divided solids maintained above the upper surface of grid structures may be minimized. Processing interruptions attributable to grid structures may be avoided.

We provide for each aperture in the grid structure a downwardly depending pipe, open at both ends, and having at its lower portion a plurality of peripheral apertures each being many fold larger in cross-sectional area than the cross-sectional area of the particles undergoing treatment. The pipes are bonded to the grid structure in such a manner that the only communication between the two treatment zones is through the pipes. The pipes should have a length which is at least five times their inner diameter. The peripheral apertures should be confined to the lower portions of the depending pipes whereby the geometric centers of the apertures are within a distance from the bottom of the pipe equal to three times the inner diameter of the pipe. The cumulative cross-sectional area of the peripheral apertures should be only a minor portion of the total peripheral area of the pipe.

For a full understanding of the present invention, its objects and advantages, reference should be had to the following description and accompanying drawings in which.

Figure 1:
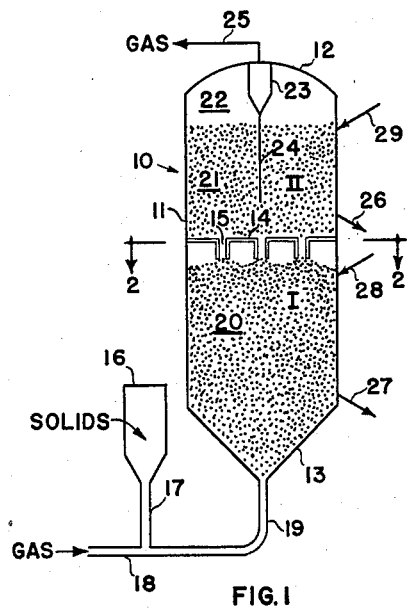
Figure 1 is a diagrammatic illustration in cross-section of a two stage fluidized solids processing system to which the present invention is applicable.

Referring to Figure 1, the fluidized solids contacting system to which the present invention is applicable will be described in greater detail. A vessel 10 is provided having vertical side walls 11, a top wall 12, and bottom walls 13 to confine solids and gases undergoing treatment. A horizontal plate 14 having apertures 15 extending therethrough is provided in the central portion of the vessel 10 to separate the vessel 10 into a first treatment zone I and a second treatment zone II. Finely divided solids of fluidizable size are introduced from a supply hopper 16 through a conduit 17 for entrainment in a fluidizing gas flowing through a conduit 18. A suspension of entrained solids and fluidizing gas is introduced through a conduit 19 into the bottom of the vessel 10, i. e., into the first treatment zone I. The entrained solids become a part of a fluidized bed 20 which is maintained within the first treatment zone I. The gases pass upwardly between the solid particles in the bed 20 at a superficial linear velocity sufficient to create the random particle motion associated with the fluidized solids contacting technique. Gases which have passed through the bed 20 rise through the apertures 15 along with finely divided solids entrained therein during passage through the bed 20. Thus a solids-in-gas suspension enters the second treatment zone II. The entrained solids become a part of a fluidized bed 21 maintained within the second treatment zone II. The fluidizing gases pass through the bed 21 at a superficial linear velocity sufficient to create the random motion associated with the fluidized solids contacting technique. A disengaging space 22 above the level of the fluidized bed 21 effects partial separation of entrained solids from fluidizing gases. The gases are removed from the vessel 10 through a cyclone separator 23 which recovers any entrained solids therein and returns them to the bed 21 through a cyclone dipleg 24. Solids-free fluidizing gases are removed from the separator 23 through a conduit 25.

Processed solid particles may be removed from the system through a conduit 26. Alternatively, the cyclone separator 23 may be eliminated and fluidizing gases with entrained solids may be removed as a solids-in-gas suspension through the conduit 25. The relative volume of the beds 20 and 21 will determine the relative residence times of the solid particles undergoing treatment in the two stage processing system. The rate at which solids are introduced into the system through conduit 17 permits regulation of the absolute residence time of the solid particles in the entire system. An additional solids withdrawal conduit 27 may be provided in the first treatment zone I for removal of finely divided solids from the bed 20, if desired. Solids introduction conduits 28 and 29 may be provided for introducing additional solids into the first treatment zone I and second treatment zone II respectively, if desired.

Figure 2:
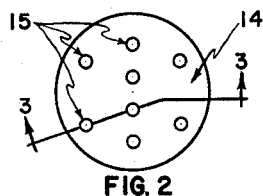
Figure 2 is a plan view of a horizontal grid structure taken along the line 2—2 of Figure 1.

Referring to Figure 2, a plan view is illustrated of the horizontal grid plate 14 taken along the line 2—2 of Figure 1. For illustrative purposes, the horizontal grid plate 14 in Figure 2 is provided with eight apertures 15 distributed in a geometric pattern over its surface. The ratio of the cumulative area of the apertures 15 to the total cross-sectional area of the grid plate 14 determines the superficial linear velocity of fluidizing gases which pass through the apertures 15. A relatively high velocity of fluidizing gases through the apertures 15 is desirable to promote entrainment of solid particles and transfer thereof through the apertures.

Figure 3:
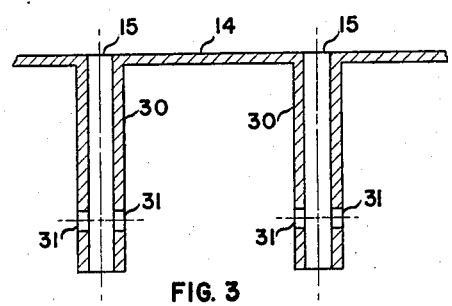
Figure 3 is a cross-sectional illustration of the improved grid structure according to the present invention taken along the line 3—3 of Figure 2.

Referring to Figure 3, the improved grid structure of the present invention is illustrated. Figure 3 is a cross-sectional view taken along the line 3—3 of Figure 2. The horizontal grid plate 14 is provided with apertures 15. A downwardly depending pipe 30 is associated with each aperture 15. The pipe 30 is open at both ends and, at its upper end, is bonded to the horizontal grid plate 14. Thus the only communication between the zone above the grid plate 14 and the zone below the grid plate 14 is through the pipes 30. A plurality of peripheral apertures 31 are provided in the lower portion of each pipe 30. The cross-sectional area of each peripheral aperture 31 is many fold larger than that of the particles undergoing processing.

Figure 4:
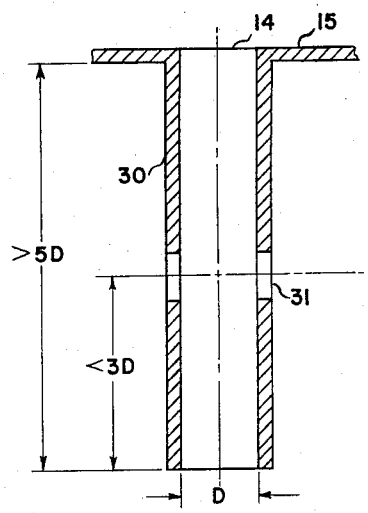
Figure 4 is an enlarged illustration in cross-section of one downwardly depending pipe and the associated horizontal grid structure illustrating dimensional considerations.

As shown in Figure 4, the length of the pipe 30 should exceed five times the inner diameter of the pipe. The maximum limitation on the length of the pipe 30 is determined by the level desired in the fluidized bed 20 (Figure 1). The uppermost peripheral aperture 31 of the pipes 30 will define the upper level of the fluidized bed 20.

The peripheral apertures 31 should be located so that their geometric center is not greater than three times the inner diameter above the open bottom of the pipe 30.

The operation of the apparatus of the present invention will now be described with reference to Figure 1. As the particles forming the fluidized bed 20 experience the characteristic slugging of fluidized processing, they tend to be transported upwardly into contact with bottom surface of the grid plate 14. Fluidizing gases are free to escape from the first treatment zone I through the apertures 15. The fluidizing gases acquire access to the apertures 15 by passing through the open bottom of pipes 30 or through the peripheral apertures 31. Transitory plugging occurring at these apertures is not of the permanent type and the compacted mounds of particles disintegrate readily since the fluidizing gases are free to enter the apertures 15 through the unobstructed openings in the pipe 30. Thus plugging of the horizontal grid structure is avoided and, as a result, the gas distribution in the second treatment zone II is maintained uniform thereby avoiding slugging and channeling phenomena.

EXAMPLES

To illustrate the comparative improvement which can be obtained with the grid structure of the present invention, a series of tests were conducted with a variety of grid structures. A fluidizing vessel corresponding to that shown in Figure 1 was employed. The vessel was 120 inches high and was 6 inches in inner diameter. The vessel was divided into two chambers by a horizontal grid plate 60 inches from the top of the vessel. A conical bottom wall was provided at the base of the vessel through which fluidizing gases and solids were introduced into the lower chamber. Gases and solids were withdrawn overhead from the upper chamber into a dust collecting bag. The solids employed in the tests comprised finely divided coal containing about 5 percent by weight of particles retained on a 14 mesh Tyler Standard screen and containing about 18 percent by weight of particles capable of passing through a 200 mesh Tyler Standard screen. Solids were introduced into the lower chamber at a rate of 10 pounds per hours. Gases were introduced into the lower chamber in sufficient quantities to provide a linear fluidizing velocity of 1 foot per second.

A first pressure tap was provided above the horizontal grid and a second pressure tap was provided below the horizontal grid. These two pressure taps were joined in a differential pressure recording meter to provide a continuous record of the differential pressure across the horizontal grid. Thus the meter indicated and recorded the pressure drop experienced by fluidizing gases in passing through the grid structure.

After a fluidized bed of solids had been established in the lower chamber, the continued introduction of solids and gases into the lower chamber caused particles of solids to rise through the horizontal grid into the upper chamber to establish a fluidized bed therein.

The cumulative cross-sectional area of the apertures in the horizontal plate was about one-hundredth of the cross-sectional area of the fluidizing vessel so that a superficial linear velocity of about 100 feet per second was provided through the grid openings.

Figure 5:
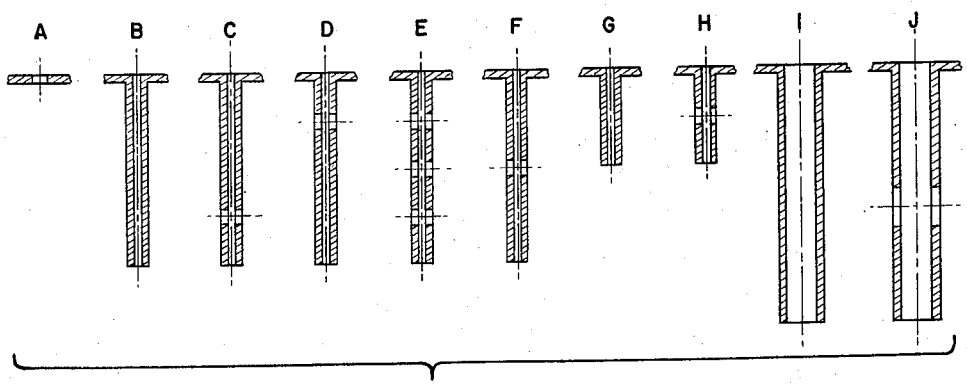
Figure 5 is a cross-sectional illustration of fragments of various grid structures, labelled A through J, constructed and tested to illustrate the improvements resulting from the present invention.
Figure 6:
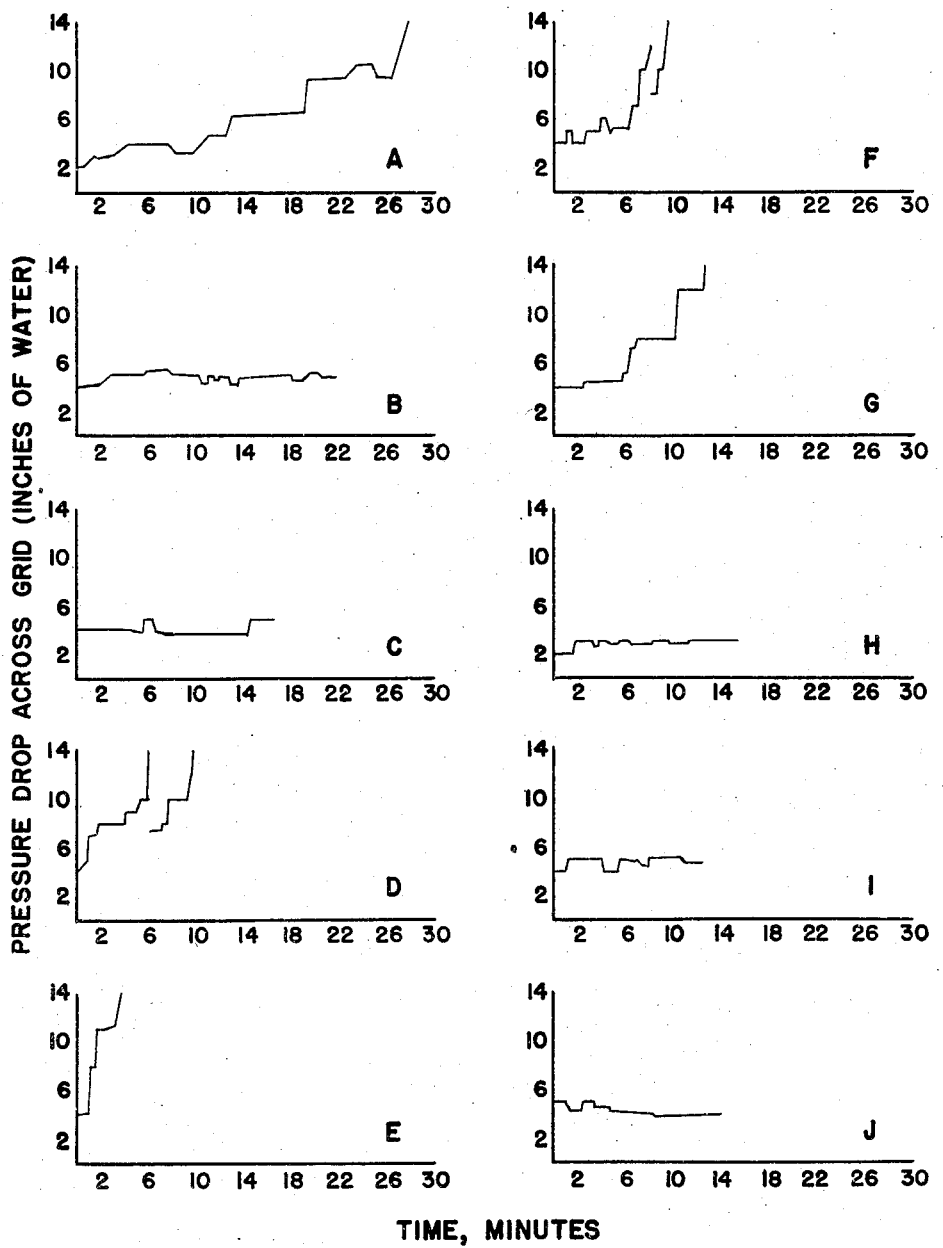
Figure 6 is a series of graphical illustrations of the pressure drop readings across each of the grid structures labelled A through J to correspond to those grid structures illustrated in Figure 5.

Ten different grid structures which were employed are illustrated in fragmentary cross-section in Figure 5. The pressure drop across each of the ten grid structures is plotted against a time coordinate in Figure 6.

*Example A*

A horizontal grid plate was employed having 8 uniformly distributed holes each 7/32-inch in diameter. There were no depending pipe sections in this grid structure. The initial pressure drop across the grid plate in this example was about 3 inches of water. As slugging occurred in the lower chamber, the pressure drop across the grid surged to values of 4½ to 5 inches of water. As operations continued, plugs of solids formed at the apertures in the grid and the pressure drop across the grid increased by about 2 inches of water for each plug formed. After about 30 minutes, the entire grid was plugged.

*Example B*

The horizontal plate depending in Example A was fitted with eight downwardly depending tubes ⅛" I. P. S., having an inner diameter of 0.265-inch and 3 inches long. There were no side orifices in the tubes. The average pressure drop across the grid was about 5 inches of water. Occasional fluctuations in pressure drop were observed. The time required for the system to recover normal pressure drop after experiencing a surge was about 0.4 minute. No plugging occurred over the test period.

*Example C*

The horizontal grid plate described in Example A was fitted with eight downwardly depending tubes ⅛" I. P. S., having an inner diameter of 0.265-inch and 3 inches long. Each tube had 2 side orifices 7/32-inch in diameter having center ¾-inch from the bottom. No plugging was observed with this grid structure. The average pressure drop was about 4 inches of water with occasional fluctuations. The time required for the system to recover normal pressure drop following a pressure surge was about 0.3 minute.

*Example D*

The horizontal grid plate described in Example A was fitted with eight downwardly depending tubes ⅛" I. P. S., having an inner diameter of 0.265-inch and 3 inches long. Each tube had 2 side orifices 7/32-inch in diameter having centers ¾-inch from the grid plate. The pressure drop initially was about 4 inches of water, but rose in steps to 7 inches, 8 inches, 10 inches and finally beyond the range of recording. The system did not recover from pressure surges but instead allowed the plugging phenomenon to perpetuate. Within ten minutes after the operation had commenced, plugging necessitated shut-down.

The dotted line at 6 minutes indicates that the pressure taps became plugged, were purged and restored to service.

*Example E*

The horizontal grid plate described in Example A was fitted with eight downwardly depending tubes ⅛" I. P. S., having an inner diameter of 0.265-inch and 3 inches long. Each tube was provided with three pairs of orifices, each orifice being 7/32-inch in diameter. One pair of orifices had centers at the center of the tube; one pair of orifices was centered ¾-inch above the center and the last pair was centered ¾-inch below the center. The pressure drop across the grid was initially about 4 inches of water but rose in steps through 8 inches, 11 inches, and beyond the range of the meter. Plugging necessitated shut-down within four minutes of operation. Pressure drop increases were perpetuated following pressure surges.

*Example F*

The horizontal grid plate described in Example A was fitted with eight downwardly depending tubes ⅛" I. P. S., having an inner diameter of 0.265-inch and 3 inches long. Each tube was provided with 2 side orifices at its center, each 7/32-inch in diameter. This grid structure performed satisfactorily for a brief period. Thereafter, the pressure drop increases perpetuated until plugging necessitated shut-down within ten minutes of operation.

The dotted line at 8 minutes indicates that the pressure taps became plugged, were purged and restored to service.

*Example G*

The apparatus described in Example A was equipped with eight downwardly depending tubes ⅛" I. P. S., having an inner diameter of 0.265-inch and 1½ inches long. The tubes had no side orifices. The tubes plugged immediately. No recovery was evident. Each pressure drop increase was perpetuated and, within thirteen minutes, plugging necessitated shut-down.

*Example H*

The horizontal grid structure described in Example A was fitted with eight downwardly depending tubes ⅛" I. P. S., having an inner diameter of 0.265-inch and 1½ inches long. Two side orifices each 7/32-inch in diameter were provided ¾-inch from the lower end. No plugging was experienced with this grid structure. The average pressure drop was about 3 inches of water. Increases in pressure drop were eliminated within 0.2 minute.

*Example I*

A new horizontal grid plate having a single center aperture ½-inch in diameter was provided with a ½-inch inner diameter tube extending downwardly for 4½ inches. No side orifices were provided in the tube. The average pressure drop across this grid was about 5 inches of water. The average pressure drop increase experienced was about 1 inch of water. Normal pressure drop was recovered in about 0.4 minute following pressure surges. No plugging was experienced.

*Example J*

The grid described in Example I was altered by the provision of two side orifices each ⅝-inch in diameter having centers 1¾ inches from the bottom end. No plugging was experienced. The average pressure drop was about 4 inches of water. Recovery time was 0.2 minute.

Thus it is seen that the grid structures encompassed by the present invention perform satisfactorily. The grid structures exhibiting the most rapid recovery from pressure drop surges were those of Examples C, H and J which experienced no permanent or perpetuating plugging.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. In a chamber having two vertically separated treatment zones for sequentially treating finely divided solids under fluidized conditions with gases in a lower zone whence said solids and gases pass upwardly into an upper zone including means for introducing said solids and said gases into said lower zone, grid means extending across said chamber for separating said zones, means for removing said solids and means for removing said gases from said upper zone, the improvement in said grid means comprising a downwardly depending pipe open at both ends associated with each opening in said grid having a length exceeding five times the inner diameter of said pipe, said pipe having a plurality of apertures in its periphery in that lower portion thereof which extends for three inner diameters from the bottom thereof.

2. In a chamber having two vertically separated treatment zones for sequentially treating finely divided solids under fluidized conditions with gases in a lower zone whence said solids and gases pass upwardly into an upper zone including means for introducing said solids and said gases into said lower zone, horizontal grid means extending across said chamber for separating said zones, said grid means having a plurality of openings, means for removing said solids and means for removing said gases from said upper zone, the improvement in said grid means comprising a downwardly depending pipe open at both ends associated with each opening in said grid having a length exceeding five times the inner diameter of said pipe, said pipe having a plurality of apertures in its periphery in that lower portion thereof which extends for three inner diameters from the bottom thereof.

3. In a chamber having two vertically separated treatment zones for sequentially treating finely divided solids under fluidized conditions with gases in a lower zone whence said solids and gases pass upwardly into an upper zone including means for introducing said solids and said gases into said lower zone, grid means extending across said chamber for separating said zones, means for removing said solids and means for removing said gases from said upper zone, the improvement in said grid means comprising a downwardly depending pipe open at both ends associated with each opening in said grid, said pipe having an inner diameter many fold larger than the diameter of individual particles of said solids and having a length exceeding five times the inner diameter of said pipe, said pipe having in its periphery a plurality of apertures many fold larger in cross-sectional area than individual particles of said solids, said apertures being located in that lower portion of said periphery which extends for three inner diameters from the bottom thereof.

4. In a chamber having two vertically separated treatment zones for sequentially treating with gases under fluidizing conditions finely divided solids having a tendency to exhibit slugging properties in a lower zone whence said solids and gases pass upwardly into an upper zone including means for introducing said solids and said gases into said lower zone, grid means extending across said chamber for separating said zones comprising a wall having at least one perforation encompassing in cumulative cross-sectional area only a minor portion of the cross-sectional area of said wall, means for removing said solids and means for removing said gases from said upper zone, the improvement in said grid means comprising a downwardly depending pipe open at both ends associated with each perforation in said grid means having a length exceeding five times the inner diameter of said pipe, said pipe having a plurality of apertures in its periphery only in that lower portion thereof which extends for three inner diameters from the bottom thereof.

5. In a chamber having two vertically separated treatment zones for sequentially treating finely divided caking coal with gases under fluidizing conditions in a lower zone whence said coal and gases pass upwardly into an upper zone including means for introducing said coal and said gases into said lower zone, grid means extending across said chamber for separating said zones comprising a wall having at least one perforation encompassing in cumulative cross-sectional area only a minor portion of the cross-sectional area of said wall, means for removing said coal and means for removing said gases from said upper zone, the improvement in said grid means comprising a downwardly depending pipe open at both ends associated with each perforation in said grid means having a cross-sectional area many fold larger than the diameter of individual particles of said coal, said depending pipe having a length exceeding five times the inner diameter thereof and having a plurality of apertures in its periphery only in that lower portion thereof which extends for three inner diameters from the bottom thereof, each of said apertures having a cross-sectional area many fold larger than individual particles of said coal and comprising in cumulative cross-sectional area only a minor portion of the periphery of said pipe.

References Cited in the file of this patent

UNITED STATES PATENTS

| | | |
|---|---|---|
| 2,439,582 | Scheineman | Apr. 13, 1948 |
| 2,471,084 | Wilcox et al. | May 24, 1949 |
| 2,625,442 | Kollgaard | Jan. 13, 1953 |

UNITED STATES PATENT OFFICE

CERTIFICATE OF CORRECTION

Patent No. 2,850,808                  September 9, 1958

Sam A. Jones et al.

It is hereby certified that error appears in the above numbered patent requiring correction and that the said Letters Patent should read as corrected below.

In the grant, lines 2 and 3, and line 12, and in the heading to the printed specification, line 5, name of assignee, for "Consolidated Coal Company" read -- Consolidation Coal Company --; column 6, line 27, for "The", second occurrence, read -- Two --.

Signed and sealed this 18th day of November 1958.

(SEAL)

Attest:
KARL H. AXLINE

Attesting Officer

ROBERT C. WATSON
Commissioner of Patents